Sept. 22, 1936.   A. E. GABA   2,054,810
ADJUSTABLE PITCH PROPELLER
Filed Dec. 14, 1934   3 Sheets-Sheet 2
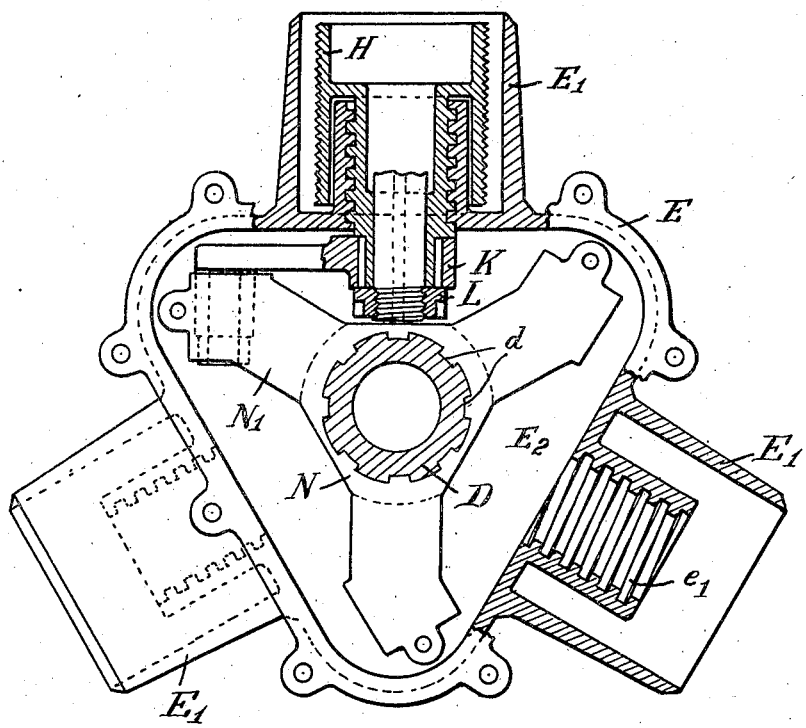
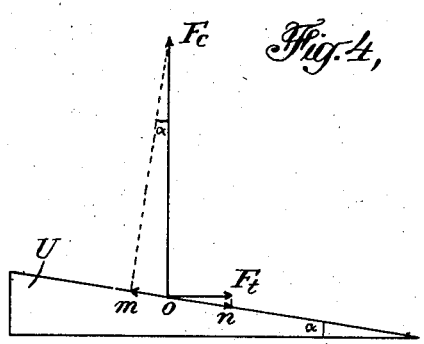
INVENTOR
Achille Ernest Gaba
BY
Pennie, Davis, Marvin & Edmonds
ATTORNEYS Sept. 22, 1936.  A. E. GABA  2,054,810
ADJUSTABLE PITCH PROPELLER
Filed Dec. 14, 1934   3 Sheets-Sheet 3

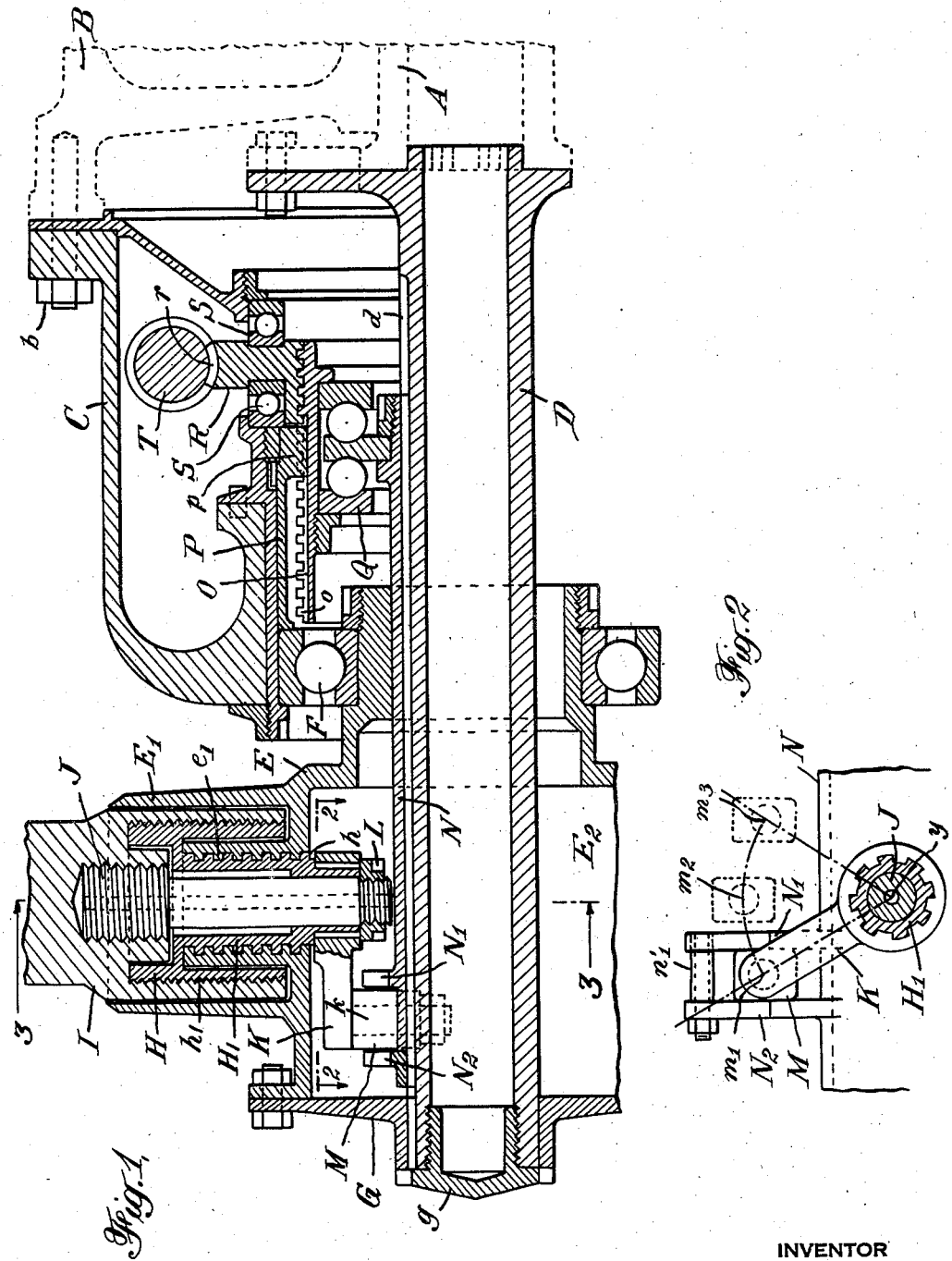

INVENTOR
Achille Ernest Gaba
BY
ATTORNEYS

Patented Sept. 22, 1936

2,054,810

UNITED STATES PATENT OFFICE 2,054,810

ADJUSTABLE PITCH PROPELLER

Achille Ernest Gaba, Paris, France

Application December 14, 1934, Serial No. 757,536
In France December 16, 1933

8 Claims. (Cl. 170—163)

This invention relates to adjustable pitch propellers and has for an object the provision of apparatus for controlling the pitch of a propeller blade, irrespective of whether or not the propeller is in motion. More particularly, the invention contemplates the provision of an improved adjustable pitch propeller adapted to be connected to the crank shaft of an airplane engine.

Heretofore it has been customary to mount propeller blades rigidly upon a hub which in turn has been firmly mounted adjacent each end upon the shaft which rotates it. In accordance with the present invention, the rearward end portion of the hub is spaced from the shaft, and the propeller blades are turnably mounted on the hub, whereby it is possible, through suitable mechanism, to control the pitch of the blades. As adapted to airplane use, the invention contemplates an adjustable pitch propeller of such nature that the pitch of the propeller blades may be varied at will by the pilot. Thus, it is possible to adjust the pitch of the propeller blades to a most efficient value, corresponding to the R. P. M. of the engine and/or a climbing, descending, or horizontal direction of flight. Furthermore, the apparatus of the invention may be adapted to bring the propeller blades into a position of no pitch (customarily referred to as "feathering") and even to reverse the pitch of the blades, thus making it possible to employ the motor as a brake when it is desired to decrease the speed of the airplane, as is frequently the case when landing.

The preferred form of apparatus of the invention comprises a shaft adapted to be connected to the crank shaft of a motor. A hub is disposed substantially in axial alignment about the forward end portion of the shaft, in spaced relationship therewith, and the forward end portion of the hub is rigidly connected to the forward end portion of the shaft whereby the hub and the shaft form a single rotatable unit.

A casing, adapted to be connected to the crankcase of the engine, is disposed about the rearward end portion of the shaft and is spaced therefrom. The forward end portion of the casing overlaps the rearward end portion of the hub and means, for example a ball or roller bearing, is disposed between the forward end portion of the casing and the rearward end portion of the hub to center the rearward end portion of the hub about the shaft in rotatable relationship with the casing.

Propeller blades are turnably mounted on the hub and are connected thereto by means of suitable helical threads, described more fully hereinafter. Associated with the lower end portion of each propeller blade is a crank arm.

A slidable sleeve is disposed about the shaft in non-rotatable relationship therewith but axially movable in relation thereto. The forward end portion of the sleeve is operatively associated with crank arms associated with the propeller blades. Means are provided adjacent the rearward end portion of the sleeve whereby the sleeve may be moved axially with relation to the shaft even when the shaft and sleeve are rotating. These means preferably comprise a non-rotatable helically threaded sleeve axially aligned about the rearward end portion of the slidable sleeve and adapted for axial movement. Suitable bearings are disposed between the slidable sleeve and the helically threaded sleeve so that an axial force applied to the helically threaded sleeve will be transmitted to the slidable sleeve irrespective of whether or not the slidable sleeve is rotating. A helically threaded member, the threads of which engage the threads of the helically threaded sleeve, is rotatably mounted with relation to the non-rotatable helically threaded sleeve and is suitably held by bearings so that it is substantially immovable in an axial direction. Thus, by applying a turning moment to the helically threaded member, this moment is translated into an axial force acting upon the helically threaded sleeve, which is transmitted to the crank arms associated with the lower end portion of the air screw blades by means of the slidable sleeve. By controlling the force applied in this manner it is possible to adjust the pitch of the blade to any desired value, subject, of course, to mechanical limitations.

The invention will be better understood from a consideration of the following description, taken in connection with the accompanying drawings, in which—

Fig. 1 represents a longitudinal cross section through the axis of a propeller constructed in accordance with the invention and adapted to be provided with three propeller blades, and with the operating mechanism at one side of the shaft only being shown;

Fig. 2 represents a section taken substantially along the line 2—2 of Fig. 1;

Fig. 3 represents a transverse cross section taken substantially along the line 3—3 of Fig. 1;

Fig. 4 represents a graphical method of calculating stresses involved in the operation of the propeller.

Figure 5:
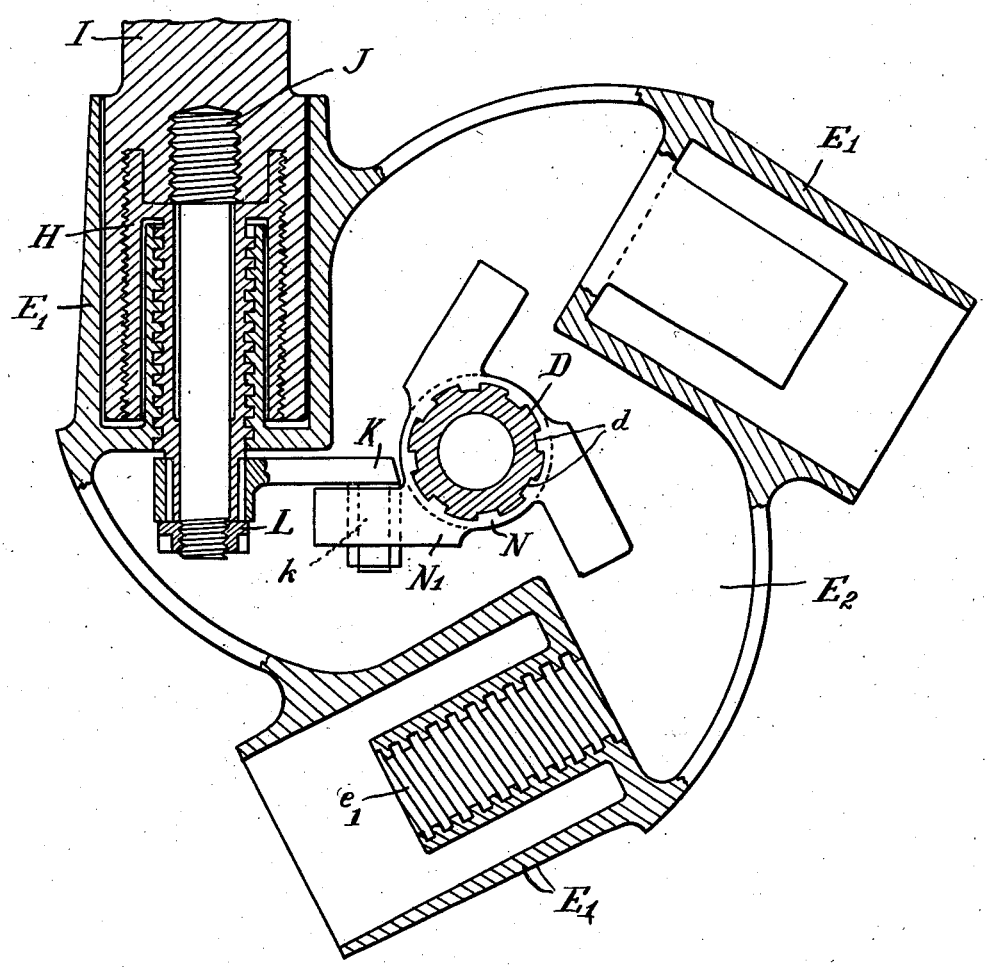
Fig. 5 represents an alternative form of propeller hub.

In the apparatus shown in Figs. 1 to 3 of the drawings, the forward end portion of the crank shaft A of a motor is rigidly connected to a shaft D which serves to transmit the power of the engine to the propeller blades. A hub E is mounted in axial alignment about the forward end portion of the shaft D and is spaced therefrom to provide an annular space $E_2$ between the hub E and the shaft D. A casing C is mounted about the rearward end portion of the shaft and is rigidly connected to the crank-case B of the motor by means of stud bolts and nuts $b$. Mounted radially on the hub E are a plurality of stub branches $E_1$ (three in number for a three bladed propeller). The rearward end portion of the hub E is held in axial alignment with the shaft D and in rotatable relationship with the casing C by means of a ball bearing journal F. The forward end portion of the hub is rigidly connected to the forward end portion of the shaft D by means of a plate G, which is held in position by means of a supporting member $g$. The mechanism for controlling the pitch of the propeller blades is arranged within the annular space $E_2$ between the hub E and the shaft D, and within the annular space between the casing C and the shaft D.

Positioned substantially axially within each stub branch $E_1$ is a cylindrical member $e_1$ which is provided upon its inner surface with helical threads. A cylindrical core H is provided on its outer surface with threads $h_1$ firmly engaging corresponding threads disposed adjacent the lower end portion of a propeller blade I. The core H has integrally formed therewith an inner cylindrical core $H_1$. The walls of cores H and $H_1$ are spaced apart to provide an annular pocket therebetween. The outer surface of the inner core $H_1$ is provided with helical threads engaging the threads on the inner surface of the hollow cylindrical threaded member $e_1$ and serves to hold the blade I firmly yet turnably within the stub branch $E_1$. The junction of the lower end portion of the propeller blade with the core H is completed by means of a threaded central stud J, one end portion of which is threaded in a reverse direction to the threads $h_1$ and enters a correspondingly threaded recess in the lower end portion of the blade I. It will be noted that by this means of connecting the blade I to the hub E, forces such as centrifugal force, which are exerted on the lower end portion of the blade are resisted by the threads provided upon the member $e_1$. On the one hand, these threads provide a continuous and important supporting surface with regard to wear and to the resistance of forces exerted upon them, and on the other hand, the relatively small diameter of the threaded member $e_1$ ensures suitable reduction of the forces that must be applied to turn the blade against the forces exerted when in motion.

A crank arm K is wedged to the lower end portion of the inner cylindrical core $H_1$ and is held in position by a nut L engaging threads on the lower end portion of the stud J. The nut L also serves to engage the stud J with the core $H_1$. The crank arm K is provided with a cylindrical handle $k$, which in turn is fitted with a rectangular block M rotatably mounted thereon.

A turning moment is applied to the crank K by axial movement of a sleeve N, mounted non-rotatably about the shaft D but in slidable relation thereto. The blocks M on the handles $k$ of the crank arms are operatively associated with the sleeve N by means of supporting frames $N_1$ and $N_2$. The frames $N_1$ and $N_2$ are rigidly connected together adjacent one end by a brace $n_1$ and are rigidly connected adjacent the other end to the sliding sleeve N. The frame $N_2$ acts as a regulating stop for the sliding sleeve N. The sleeve N is held in non-rotatable relationship with the shaft D by positive engagement with the grooves $d$ in the shaft.

The mechanism which operates the sliding sleeve is mounted within the annular space between the casing C and the shaft D and comprises a sleeve O helically threaded upon its outer surface and provided with longitudinal slots $o$. The slots $o$ engage corresponding teeth $p$ mounted upon a fixed and immovable member P which is connected to the casing C. In this manner, the helically threaded sleeve O is held in a non-rotatable position but is axially movable. The helically threaded sleeve O is associated with the sliding sleeve N by means of a double ball bearing thrust Q, so that an axial force applied to the sleeve O is transmitted to the sliding sleeve N irrespective of whether or not the sleeve N is rotating.

Axial movement of the sleeve O is effected by rotation of a threaded member (worm wheel) R. The threads arranged upon the threaded member R engage the threads of the helically threaded sleeve O, and axial movement of the threaded member R is prevented by suitable ball-bearing thrusts S, which, however, do permit free rotation of the member. The outer surface of the threaded member R is advantageously provided with gear teeth $r$. A worm gear T engaging the gear teeth of the threaded member R provides a suitable means for effecting rotation of the member. The worm gear T may be operated either from within or without the casing C, either by an electric motor or by any suitable mechanical arrangement.

In Fig. 2, the extreme positions that the block M (and consequently the crank arm K) can assume are shown. The extreme forward position $m_1$, an intermediate position $m_2$, and the extreme rear position $m_3$ are illustrated. Thus, axial movement of the sliding sleeve N may vary the pitch of the propeller blades by a value corresponding to any angle not exceeding the angle $m_1$ $y$ $m_3$. A small corresponding axial movement of the propeller blade, in proportion to the pitch of the threads of the threaded member $e_1$, will obviously result. The propeller blades are suitably adjusted when the unit is assembled, and thereafter the pitch may be adjusted by any value not exceeding the value corresponding to the angle $m_1$ $y$ $m_3$ by suitable axial movement of the sleeve N.

A modified form of the propeller hub is illustrated in Fig. 5. In this modification the stub branches $E_1$ extend substantially tangentially from the hub itself. The propeller blades I are turnably positioned within the stub branches in substantially the same manner as described above, and a crank arm K is associated with the lower end portion of each. A turning moment may be applied to the crank arm K by sliding the sleeve N axially along the shaft D. Except for changes in the shape of some of the elements of the mechanism, made necessary by the tangential position of the stub branches $E_1$, the construction and operation of the modification illustrated in Fig. 5 is substantially identical with that described above in conjunction with Figs. 1 to 3.

The forces necessarily applied in order to effect desired changes of the pitch of the propeller blades may be calculated in a graphical manner illustrated in Fig. 4, for example, as follows:

Let U represent a development of the threads of the threaded member $e_1$, having a pitch $\alpha$.

On the one hand, the centrifugal force of the blade exerted against the surfaces provided by the threads of the threaded member $e_1$ and centered at $o$ exert a sliding pressure $$om = Fc(\sin \alpha)$$

and a frictional pressure $Fc_1 = Fc(\cos \alpha)(\tan \varphi)$ (where $\tan \varphi$ = the co-efficient of friction.)

On the other hand, the torsion exerted by a torque $Ft$ produces a sliding pressure $$on = Ft(\cos \alpha)$$

and a frictional pressure $$Ft_1 = Ft(\sin \alpha)(\tan \varphi)$$

If, when the pitch of the blades is normal, the operating mechanism is called upon to turn the blades to their "feathered" position, in the direction $om$, the resultant of the centrifugal force and the torsion torque will be represented by the equation $$\Delta_1 = -om + Fc_1 + Ft_1 + on$$

in which case the torsion torque $Ft$ tends toward zero. To obtain a reverse movement, we have $$\Delta_2 = +om + Fc_1 + Ft_1 - on$$

and if this movement is continued toward reversing the pitch of the blades, we have $$\Delta_3 = +om + Fc_1 + Ft_1 + on$$

(in this case the reverse torsion torque increases to a maximum).

In changing the pitch from a reverse position to the stationary or "feathered" position, we have $$\Delta_4 = -om + Fc_1 + Ft_1 - on$$

The above equations have been developed for a propeller assembly rotating in clockwise direction and having right-handed retaining threads to hold the blades in position.

The mechanism herein described should be able to withstand the most severe conditions, even those represented by $\Delta_3$ above. Knowing the maximum force required to turn the blade in the threaded member of the hub, we can calculate the maximum force that must be applied to the sliding sleeve by taking into account the differences of their respective moments, that is to say the radius of the threaded core and that of the crank arm.

Furthermore, knowing the ratio of the reduction gearing between the threaded member R and the threaded sleeve Q on one hand, and the reduction between the worm gear T and the gear teeth upon the threaded member (worm wheel) R on the other hand, we can calculate the moment of force necessarily applied to the worm gear T, taking into account, of course, the friciton existing between the various elements of the mechanism.

I claim:

1. In an adjustable pitch propeller assembly, a rotatable shaft, a hub mounted about the shaft and rotatable therewith, a helically threaded member rigidly connected to the hub, a propeller blade, and means for connecting the propeller blade to the hub comprising an outer cylindrical core provided with threads adapted to engage corresponding threads disposed on the inner end portion of the blade, an inner cylindrical core disposed within the outer cylindrical core in axial alignment therewith and spaced therefrom and rigidly connected thereto, and helical threads disposed upon a surface of the inner cylindrical core and adapted to engage said helical threads upon the threaded member of the hub.

2. In an adjustable pitch propeller assembly, a rotatable shaft, a hub mounted about the shaft and rotatable therewith, a helically threaded member rigidly connected to the hub, a propeller blade, means for connecting the propeller blade to the hub comprising an outer cylindrical core provided with threads adapted to engage corresponding threads disposed on the inner end portion of the blade, an inner cylindrical core disposed within the outer cylindrical core in axial alignment therewith, spaced therefrom and rigidly connected thereto, and helical threads disposed upon a surface of the inner cylindrical core and adapted to engage said helical threads upon the threaded member of the hub, a central stud provided adjacent one end with threads adapted to engage corresponding threads disposed adjacent the inner end portion of the propeller blade, and means whereby the stud may be operatively engaged with the inner cylindrical core.

3. In an adjustable pitch propeller assembly, a rotatable shaft, a hub mounted about the shaft and rotatable therewith, a threaded member rigidly connected to the hub, a propeller blade, means for connecting the propeller blade to the hub comprising a cylindrical core provided upon its outer surface with threads adapted to engage corresponding threads disposed on the inner end portion of the propeller blade and provided with threads disposed interiorly of the first-mentioned threads and adapted to engage said threads upon the threaded member of the hub.

4. In an adjustable pitch propeller assembly, a rotatable shaft, a hub mounted about the shaft and rotatable therewith, a threaded member rigidly connected to the hub, a propeller blade, means for connecting the propeller blade to the hub comprising a cylindrical core provided upon its outer surface with threads adapted to engage corresponding threads disposed on the inner end portion of the propeller blade, and provided with threads disposed interiorly of the first-mentioned threads and adapted to engage said threads upon the threaded member of the hub, a stud provided adjacent one end portion with threads adapted to engage corresponding threads adjacent the inner end portion of the propeller blade, and means whereby the stud may be operatively engaged with the cylindrical core.

5. Apparatus for adjusting the pitch of a propeller blade operatively associated with a rotatable shaft, which comprises a slideable sleeve mounted about the shaft in such a manner as to be rotatable therewith and axially movable in relation thereto, a non-rotatable sleeve having its outer surface provided with longitudinal slots mounted about the rearward end portion of the slideable sleeve, means whereby an axial force applied to the non-rotatable sleeve will be transmitted to the slideable sleeve, a casing enclosing the non-rotatable sleeve and the rearward end portion of the slideable sleeve, and a fixed member associated with the casing and provided with teeth adapted to engage the longitudinal slots of the non-rotatable member to prevent rotation thereof.

6. Apparatus of the class described which comprises a rotatable shaft, a hub mounted upon the shaft and adapted to rotate therewith, a hollow cylindrical stub branch extending outwardly from the hub and rigidly connected thereto, a propeller blade having one end portion positioned within the stub branch and turnable about its longitudinal axis, a core member rigidly secured to the propeller blade and having outer threads adapted to engage corresponding threads provided on the inner end portion of the propeller blade and having an inner helical screw of substantially smaller diameter than the inner end portion of the propeller blade adapted to engage a threaded surface disposed within the stub branch, thereby to retain the propeller blade firmly in an operative position with relation to the hub.

7. Apparatus of the class described which comprises a rotatable shaft, a hub mounted upon the shaft and adapted to rotate therewith, a hollow cylindrical stub branch extending substantially radially from the hub and rigidly connected thereto, a propeller blade having one end portion positioned within the stub branch and turnable about its longitudinal axis, a core member rigidly secured to the propeller blade and having outer threads adapted to engage corresponding threads provided on the inner end portion of the propeller blade and having an inner helical screw of substantially smaller diameter than the inner end portion of the propeller blade adapted to engage a threaded surface disposed within the stub branch, thereby to retain the propeller blade firmly in an operative position with relation to the hub.

8. Apparatus of the class described which comprises a rotatable shaft, a hub mounted upon the shaft and adapted to rotate therewith, a hollow cylindrical stub branch extending substantially tangentially from the hub and rigidly connected thereto, a propeller blade having one end portion positioned within the stub branch and turnable about its longitudinal axis, a core member rigidly secured to the propeller blade and having outer threads adapted to engage corresponding threads provided on the inner end portion of the propeller blade and having an inner helical screw of substantially smaller diameter than the inner end portion of the propeller blade adapted to engage a threaded surface disposed within the stub branch, thereby to retain the propeller blade firmly in an operative position with relation to the hub.

ACHILLE ERNEST GABA.